United States Patent [19]
McElroy et al.

[11] Patent Number: 5,280,665
[45] Date of Patent: Jan. 25, 1994

[54] NON-CONTACTING AUTOMOTIVE DRYER CONTROL CIRCUIT

[75] Inventors: Lucian G. McElroy, 3315 Brocker Rd., Metamora, Mich. 48455; Alvin S. Raby, Clarkston; Alexander B. Faytlin, Oak Park, both of Mich.

[73] Assignee: Lucian G. McElroy, Metamora, Mich.

[21] Appl. No.: 990,429

[22] Filed: Dec. 15, 1992

Related U.S. Application Data

[63] Continuation of Ser. No. 792,226, Nov. 14, 1991, Pat. No. 5,184,369.

[51] Int. Cl.⁵ .............................................. A47L 9/28
[52] U.S. Cl. ......................................... 15/319; 15/316.1
[58] Field of Search ................. 15/316.1, 405, 319; 134/57 R, 123; 901/7, 43

[56] References Cited

U.S. PATENT DOCUMENTS

| | | | |
|---|---|---|---|
| 4,278,046 | 7/1981 | Clarke et al. | 901/43 X |
| 4,446,592 | 5/1984 | McElroy | 15/316.1 |
| 4,562,848 | 1/1986 | Messing et al. | 15/53.3 X |
| 4,587,688 | 5/1986 | Gougoulas | 15/316.1 |
| 4,719,932 | 1/1988 | Burton | 134/57 R |
| 4,798,217 | 1/1989 | Hanna | 134/57 R |
| 4,809,392 | 3/1989 | Larson et al. | 15/319 X |
| 4,817,301 | 4/1989 | Belanger et al. | 15/316.1 X |
| 4,856,543 | 8/1989 | Petit | 134/57 R |
| 4,934,018 | 6/1990 | Fortier et al. | 15/319 X |
| 4,949,423 | 8/1990 | Larson et al. | 15/316.1 |
| 4,995,136 | 2/1991 | Smith | 15/312.1 |
| 5,016,662 | 5/1991 | Crotts et al. | 134/57 R X |

Primary Examiner—Chris K. Moore
Attorney, Agent, or Firm—Reising, Ethington, Barnard, Perry & Milton

[57] ABSTRACT

A drying apparatus (10) for a vehicle washing system maintains blower air bags (18) a predetermined distance from the vehicle without contacting same providing forced air against the vehicle. Ultrasonic sensors (66) are provided on front and back sides of the nozzle (26) for sensing objects within a predetermined distance in combination with control circuitry. The control circuitry controls a motor (42) to retract a cord (36) to in turn raise or move out of the path of the vehicle, the air bag (18) maintaining the predetermined distance from the vehicle. The signals from each of the sensors (66) are each combined to control the motor. The control circuitry includes and oscillator, counter circuit and integrator for producing a distance ramp, and an echo detector for receiving the reflected signal for comparison to the distance ramp to determine the distance of the sensor (66) from the object.

18 Claims, 9 Drawing Sheets

NON-CONTACTING AUTOMOTIVE DRYER CONTROL CIRCUIT

This is a continuation of application Ser. No. 792,226, filed on Nov. 14, 1991, now U.S. Pat. No. 5,184,369, issued Feb. 9, 1993.

TECHNICAL FIELD

The invention relates to an apparatus for stripping fluid from a surface, such as the surface of a vehicle, and more particularly, to sensing the proximity of a vehicle and adjusting the position of a blower air bag in response thereto.

BACKGROUND ART

Car wash systems generally include drying stations which utilize flexible inflatable bags for removing fluid from a vehicle surface to dry the vehicle. Rollers have been connected to the end portions of the nozzles of the bag to engage the surface of the passing vehicle. Such is disclosed in U.S. Pat. No. 4,446,592, issued May 8, 1984 in the name of McElroy and assigned to the assignee of the subject invention.

It has become desirable to eliminate nozzle/air bag contacting the vehicle by providing a proximity sensor to sense the location of the vehicle with respect to the nozzle, and maintaining a predetermined distance therebetween. Automotive car drying systems have been proposed which utilize ultrasonics to sense the distance of the vehicle from the drying system. One such system is illustrated in U.S. Pat. No. 4,995,136, issued Feb. 26, 1991 in the name of Smith. The blower bag of the system is positioned according to an output signal from an ultrasonic imaging sensor mounted on support frame of the system. The relative position of the blower bag is measured by a linear potentiometer mounted to the piston which positions the blower. The sensor output is compared with the potentiometer output to adjust the arm to control the height of the bag from the vehicle.

U.S. Pat. No. 4,949,423, issued Aug. 21, 1990 in the name of Larson et al discloses a dryer for automatic car wash equipment utilizing two sensors to maintain the nozzle within a preselected proximity range of the top portions of the vehicle; one sensor for detecting the proximity of a nozzle to opaque top portions of the vehicle, and one sensor for detecting the proximity of the nozzle to transparent top portions of the vehicle. The means by which the nozzle is mounted and moved toward and away from the vehicles vary the orientation of the nozzle relative to vertical as the nozzles move between their uppermost and lowermost positions.

U.S. Pat. No. 4,587,688, issued May 13, 1986 in the name of Gougoulas discloses a proximity detector for car dryer equipment. The height of the dryer is adjusted by a sonar proximity detector. The sonar detector transmits a signal and receives the reflection to detect the distance by elapsed time between the transmitted and received signals.

SUMMARY OF THE INVENTION

The invention relates to an apparatus for stripping fluid from a surface moving relative to the apparatus along a path. The apparatus comprises an air distributor and a plurality of distributing members having first and second ends. The first end is supported by the air distributor about the path of the surface for receiving air under pressure from the air distributor and the second end includes the nozzle for directing the air toward the surface to strip fluid from the surface. Also included is actuator means connected between the distributor and the distributor member for moving the distributor member toward and away from the surface. Actuator control means is operatively connected to the actuator means for receiving a control signal to control movement of the actuator means. A plurality of sensor means are connected to the bag, each for sensing the distance to the surface by producing a plurality of transmissions and receiving reflected transmissions and for producing a sensed signal. The apparatus includes combining means for receiving and combining the sensed signals from the plurality of sensor means and for producing a single control signal.

The invention is also directed toward the distributor member comprising an air bag and actuator means including link means connected to the bag for controlling movement of the bag, and retracting means connected to the link means and responsive to the control signal for actuating the link means to position the bag a predetermined distance from the surface. The actuator control means includes tension means operatively connected to the retracting means for maintaining tension on the bag at the predetermined height to raise the bag in response to an external force placed on the bag.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
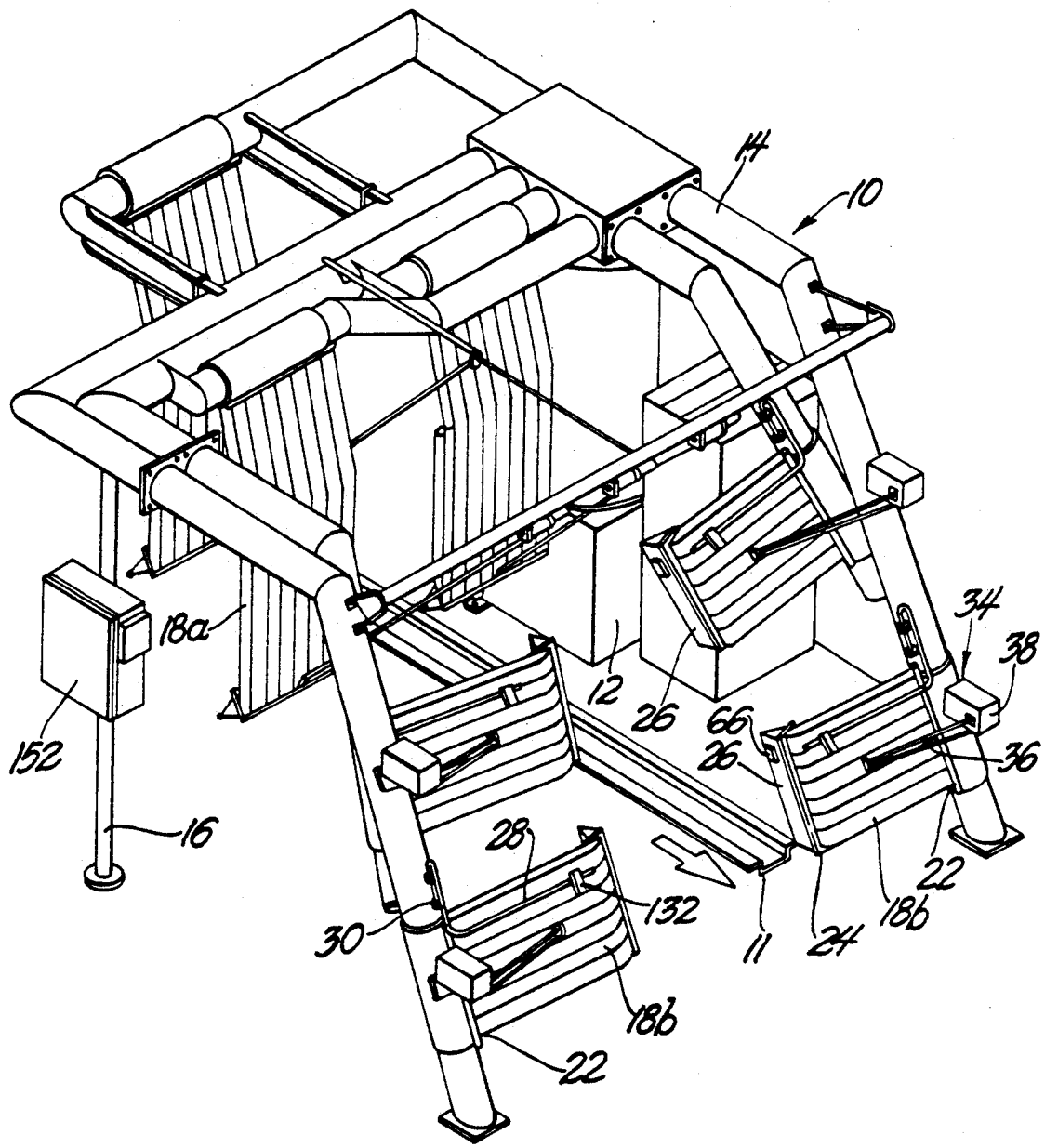
FIG. 1 is a perspective view of a drying station of a car wash system constructed in accordance with the subject invention.
Figure 2:
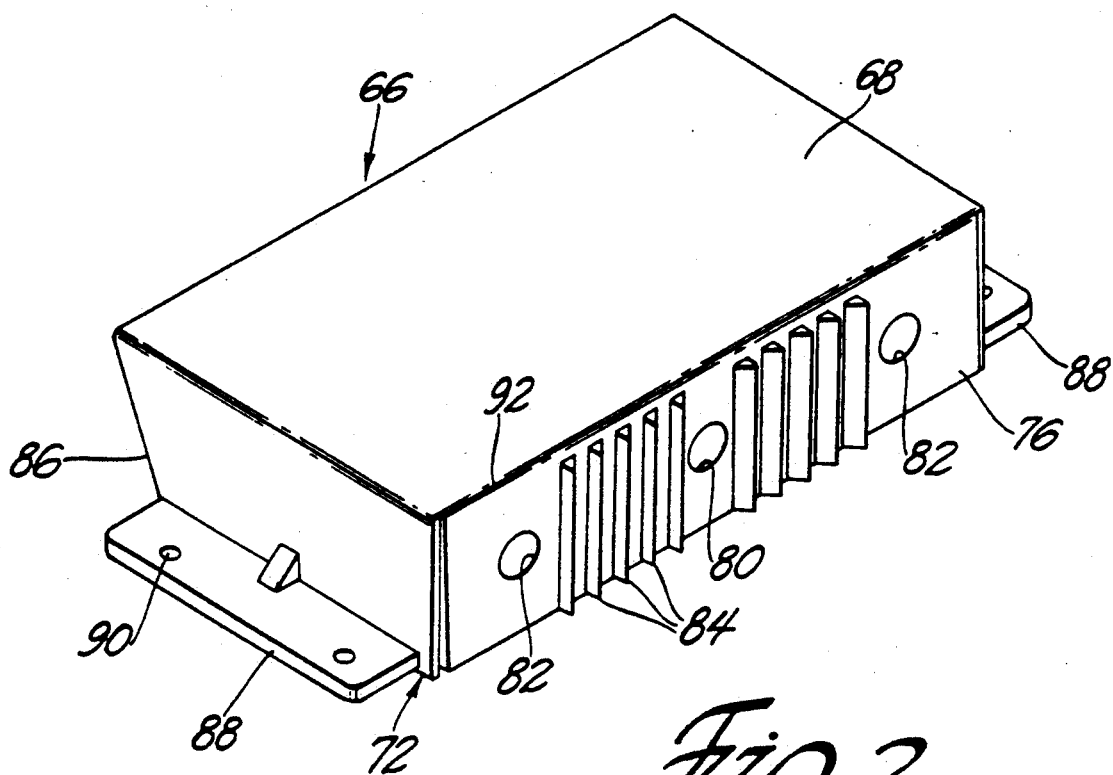
FIG. 2 is a perspective view of the supervisory sensor means.
Figure 3:
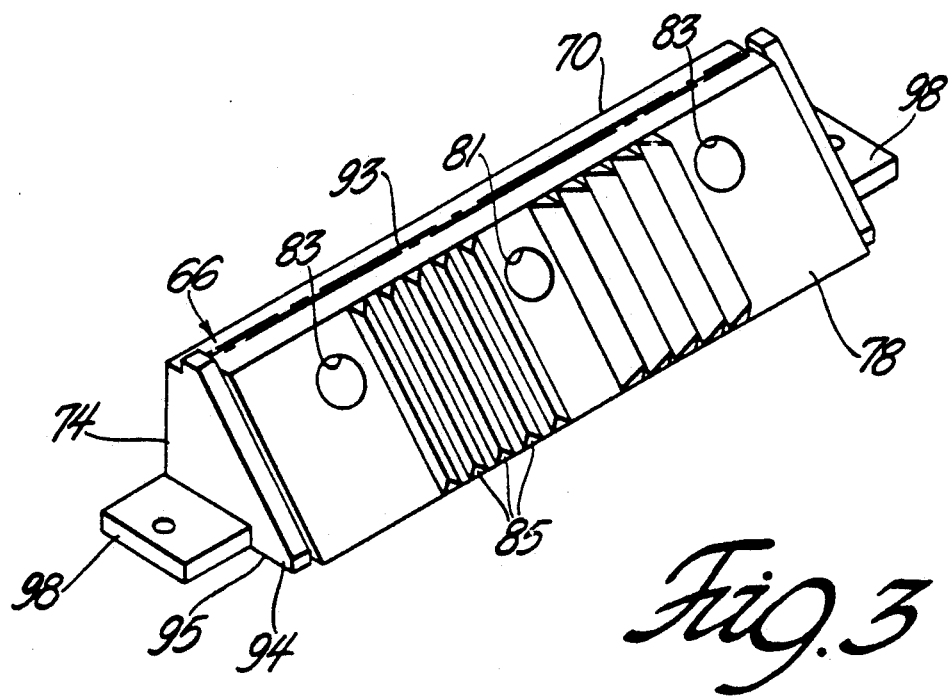
FIG. 3 is a perspective view of the satellite sensor means.

Referring to the drawings, a drying station or apparatus of vehicle washing system is generally shown at 10 in FIG. 1. The drying apparatus 10 is constructed for stripping fluid from the surface of a vehicle as the vehicle is conveyed along a path 11 through a car wash system. It is to be understood that the apparatus 10 may be used to strip liquid or material from any type of surface, and is not only limited to vehicles. Relative movement is provided between the surface and the apparatus 10. The drying station includes an air distributor including a fan assembly 12 and an overhead duct or plenum 14. Beams 16 may be used to support the plenum 14 from the floor of the car wash. The drying apparatus 10 further includes a plurality of air distributor members or flexible bags 18, each having a generally rectangular transverse cross section. The station includes a plurality of vertically hanging bags 18a and substantially horizontally disposed bags 18b. The bags 18 are supported by the air distributor plenum 14 in an array along the path of a vehicle passing through the drying station in order to strip fluid from the top and side surfaces of the vehicle. Each of the bags 18 includes a bag inlet end 22 connected to the plenum 14 for introducing air under pressure into the bags 18 and an outlet end 24 spaced from the inlet end 22. The assembly 10 further includes nozzle members 26, which are substantially the same as disclosed in U.S. Pat. No. 4,446,592 discussed in the background of the invention, and incorporated by reference herein. The length of the horizontally extending bags 18b locates the nozzle members 26 at approximately bumper height while the bags 18 are at rest. The substantially horizontally extending bags 18b have sufficient lengths so that the nozzle members 26 connected thereto will engage the oncoming vehicle. Due to the restriction at the outlet end of the bag 18 provided by the nozzle 26, a back pressure is created which is greater than atmospheric pressure to keep the bags 18 in an inflated condition. The pressure within the bags 18 determines the flexibility of the bags 18. In an inflated condition, the air pressure in the bags 18 causes the bags 18 to be somewhat stiffer or rigid. Hence, even though the bags 18 are made from a flexible material, they are self supporting when inflated. Both the nozzle members 26 and bags 18 may be of the type disclosed in the reference '592 patent, along with the air distributor. The bags 18 are pivotally connected to the air distributor plenum 14 by means as commonly known in the art.

The horizontally extending bags 18b include a reinforcing rod 28 pivotally connected to the plenum 14 by fasteners 30 at a first end thereof, and extending along the longitudinal length of the bag 18b and is received within a loop 32 attached to the bag 18. The vertically extending bags 18a hang from the plenum 14.

The apparatus 10 includes actuator means 34 connected between the distributor plenum 14 and the bag 18 for moving the bag 18 toward and away from the vehicle. The actuator means 34 includes link means 36 connected to the bag 18 for controlling movement thereof, and retracting means 38 connected to the link means 36 and responsive to a control signal for actuating the link means 36 to position the bag 18 a predetermined distance from the vehicle. Control means 40 is operatively connected to the actuator means 34 for receiving a control signal to control movement of the actuator means 34.

More specifically, the retraction means 38 includes a motor 42, and the link means 36 comprises a flexible rope or cord. The motor 42 is operatively connected to a spool 44 for controlling rotation of the spool 44 in a first direction to retract the bag 18 and in a second direction allow extension of the bag 18. The cord 36 is wrapped about the spool 44 so that when the spool rotates in a first direction the cord 36 is wrapped further upon itself on the spool 44 to thereby shorten the length of the cord 36 and to retract the bag 18 away from the vehicle. When the spool 44 is released and allowed to rotate in the second direction, the gravitational pull on the bag 18 will unwind the cord 36 from the spool 44 allowing the bag 18 to fall toward the vehicle.

The cord 36 is removably attached to the bag 18 and spool 44 by releasable means. The releasable means includes bag separable means 46 generally comprised of a bag nylon loop 45 attached to the bag 18, by stitching or other permanent connection. The cord 36 is attached to the bag nylon loop 45 by a releasing loop 47 with a hook and pile surfaces 48, 50, such as Velcro TM, therebetween. The cord 36 is secured directly to the releasable loop 47 in the vertical hanging bags 18a, and is secured through a pulley 37, which is in turn connected to the loop 47, in the horizontal bags 18b. The hook/pile material 48, 49 is fixedly attached to the ends of the releasable loop 47 by sewing, etc. The two halves of hook/pile material 48, 50 are secured to one another to maintain the cord 36 connected to the bag 18 under normal operating and tensioning operation. If by accident, a vehicle catches the cord 36, i.e., by an antenna or other protrusion from the vehicle, as the vehicle draws away from the bag 18, the cord 36 will be disconnected from the bag 18 at the separable connection 46, i.e., the loop 47 will separate from the bag loop 45 at the hook/pile surface 48, 50. This will protect any further damage to the bag 18 or motor 42.

The releasable means also includes releasing connection means 52. The cord 36 is attached to the spool 44 by the releasing connection means 52. The releasing connection means 52 comprises an aperture 54 within the spool 44 extending radially therein for approximately three-quarters of the diameter. A longitudinal bore 55 extends from the end of the spool 44 to the aperture 54. The bore 55 receives a ball 56 biased by a spring 57 and supported in the bore 55 by a plug 58. The bore 55 narrows at the juncture with the aperture 54 to allow the ball 56 to extend partially, i.e., one-third, into the aperture 54. The cord 36 is generally a nylon rope, and includes on its end a ball and shank 59. The cord 36 extends through an aperture 60 in the ball and shank 59 which is crimped thereof, and the end of the cord 36 is melted to form a head to secure the core 36 to the ball and shank 59. The ball and shank 59 is inserted within the spool aperture 54 and secured by the biased ball 56. In the case that either the cord 36 or bag 18 is ripped off by a vehicle or other means, the cord 36 will unwind from the spool 44. Upon production of a predetermined force greater than the force created by the weight of the bag 18, the ball and shank 59 will pull out from the ball 56 allowing release of the cord 36 therefrom.

Figure 4:
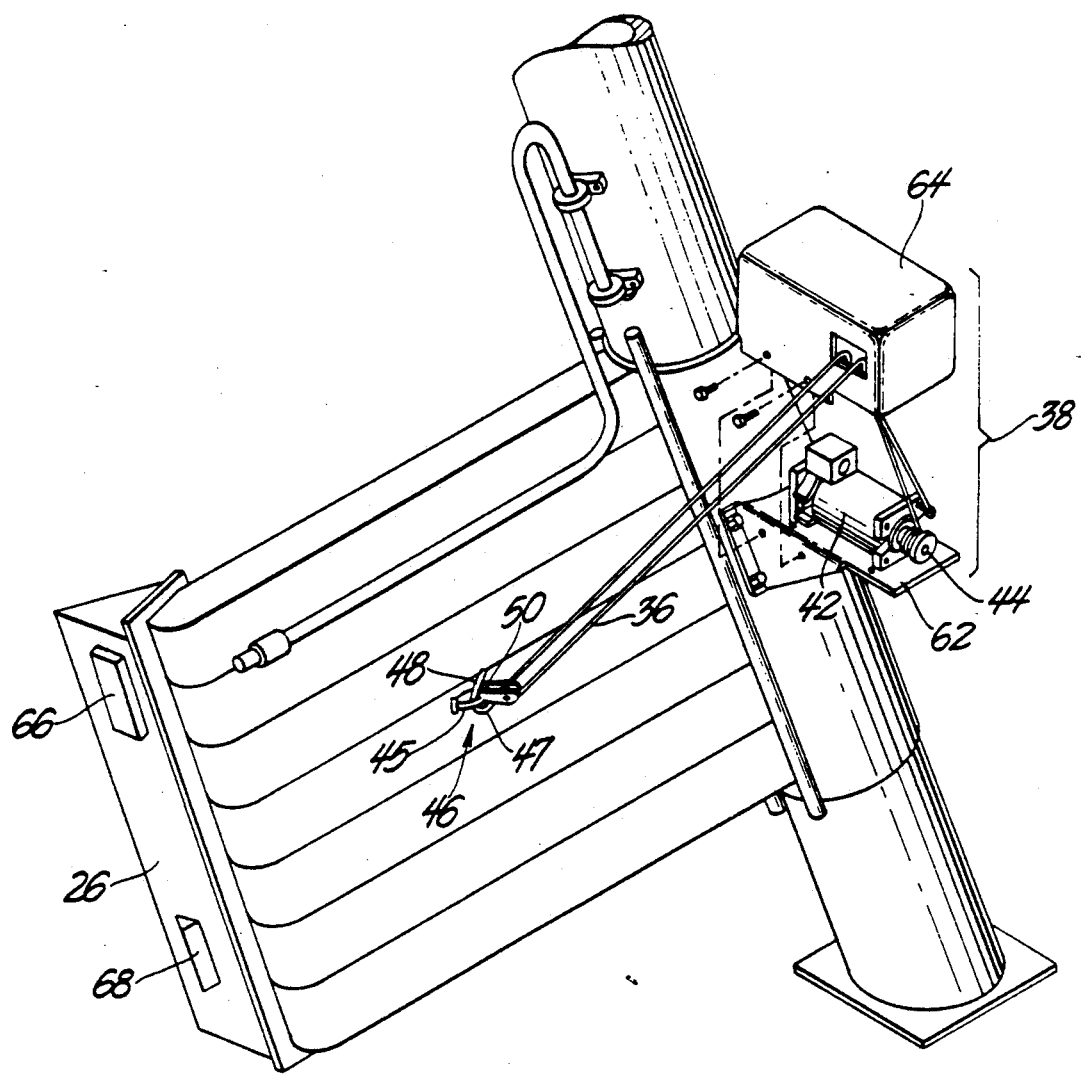
FIG. 4 is an enlarged perspective view of the actuator means in combination with the bag.
Figure 5:
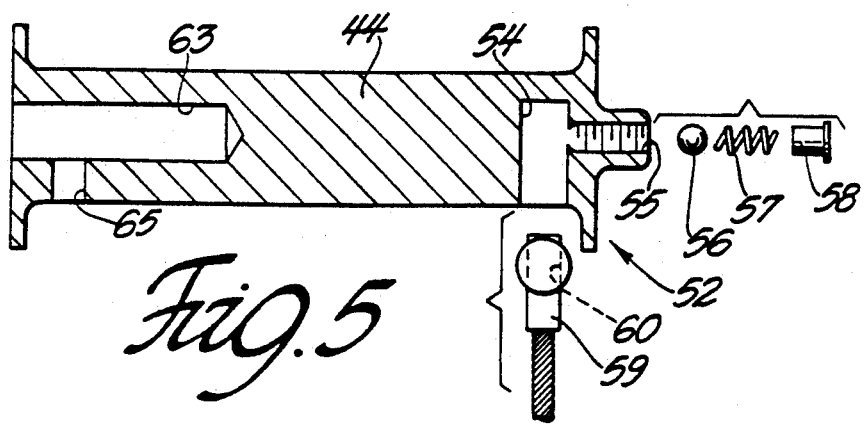
FIG. 5 is an enlarged perspective view of the bobbin/spool of the actuator means.

As illustrated in FIG. 4, the motor 42 is secured to a motor mounting plate 62, which is in turn secured to the plenum 14. A motor housing cover 64 is placed over the motor 42 on the motor mount 62 for maintaining same clean of contaminants. The spool 44 includes a second bore 63 in a second end thereof to fixedly receive a shaft of the motor 42, secured by a fastener or pin through a second radial aperture 65. In the horizontal bags 18b, the cord 36 is looped through the pulley 37 and connected to the motor housing. In the vertical bags 18a, the cord 36 is directly attached to the loop 47.

The control means 40 includes a plurality of sensor means 66 fixedly connected to the bags 18 for sensing the distance to the vehicle and for producing a sensed signal. The sensor means 66 includes supervisor sensor means 68 which provides the main control of the sensors on the bag 18, and satellite sensor means 70 which is controlled by the supervisor sensor 68 and provides remote sensing on the same bag 18 as its respective supervisor sensor 68. The sensor means 68, 70 include housing means 72, 74 for housing the electronic circuits as subsequently explained. Each of the sensor means 68, 70 include a sensor face 76, 78 which is generally in the direction of the nozzle 26 and toward the vehicle. The sensor face 76, 78 includes a transmitter aperture 80, 81 and two receiver apertures 82, 83. The transmitter aperture 80, 81 is centered between the two receiver apertures 82, 83 with spacing therebetween. Projecting from the sensor face 76 between the apertures 80-83 are a plurality of barriers 84, 85 for blocking transmission from the transmitter directly to reception by the receiver. The barriers 84, 85 are generally in the form of a saw tooth having its angular face directed toward the transmitter aperture 80, 81. There are generally five saw teeth 84, 85 spaced the length of a waveform apart from one another between the aperture 80-83. The saw teeth 83, 84 extend transverse to the line between the apertures 80-83. The supervisor sensor means 68 includes a generally rectangular shaped flexible plastic box 86 having a pair of flanges 88 extending therefrom with apertures 90 therein for receiving a fastener in order to be fastened to the bag 18 or nozzle 26. The front face 76 forms one of the sides of the rectangular housing 86 and is connected on one longitudinal side thereof providing a hinge 92. The hinge 92 allows the front or sensor face 76 to be angled with respect to the remainder of the housing 86 once installed upon the bag 18 to provide proper angular orientation for direction toward the vehicle. The satellite sensor means 70 includes a generally triangular housing 94 having two enclosed sides 93, 95 forming right angles, and the front face 78 forming the third side. The front face 78 is fixedly connected to one of the sides to form a hinge 93 as in the supervisor means 68. The housing 94 includes two ends having flanges extending therefrom for receiving fasteners for securing to the nozzle 26. Once the sensor faces 76, 78 are positioned, the seams of the sensors 66 are sealed with an epoxy, such as super glue of the type 3M-CA40. The housings 86, 94 may be comprised of a urethane material, such as Hytrel by DuPont.

Figure 6:
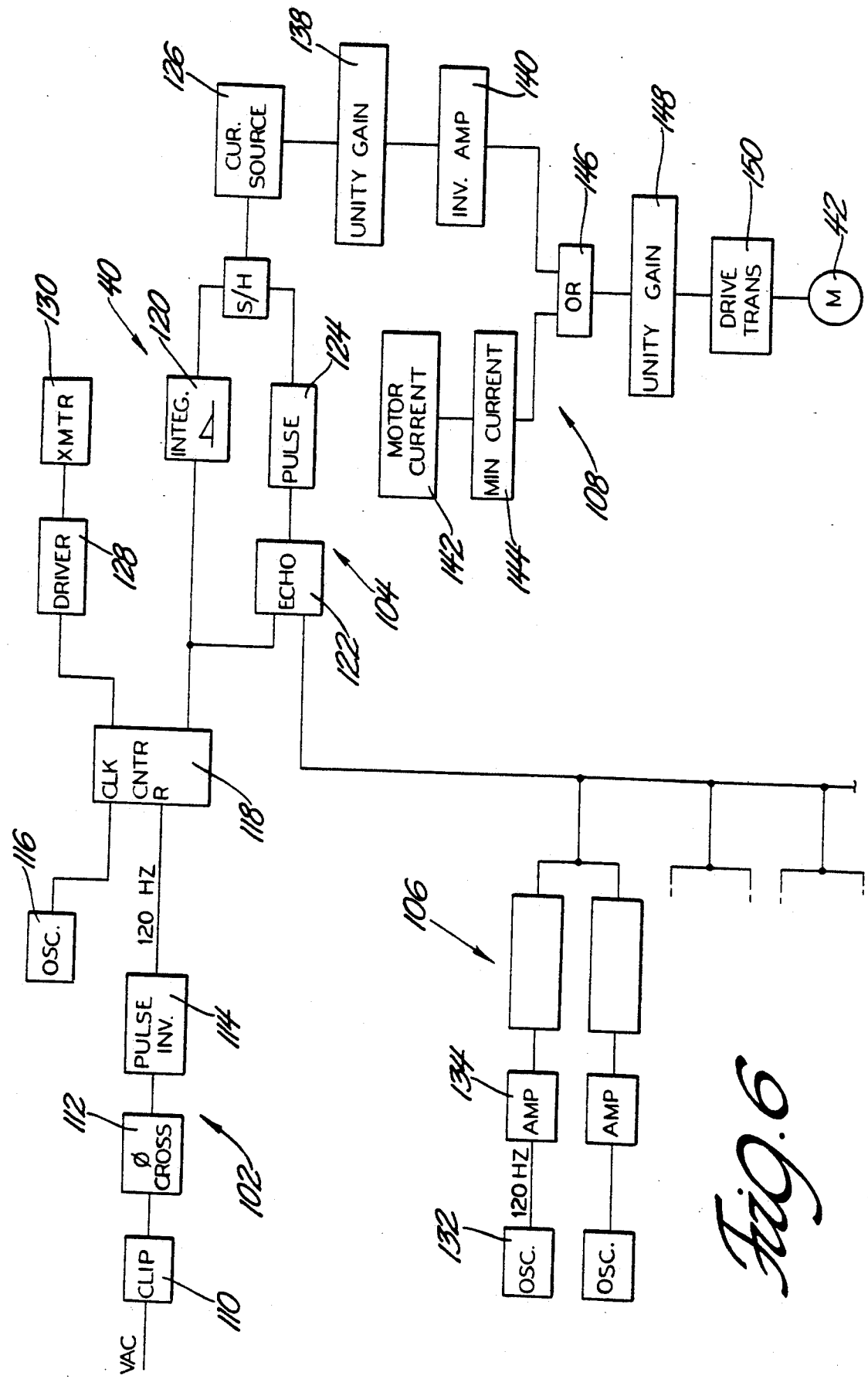
FIG. 6 is a block diagram of the control means of the subject invention.

The control means 40 is generally indicated in FIG. 6 and controls the actuator means 38 and the distance of the bag 18 from the vehicle. The control means 40 is generally comprised of timing means 102, supervisory means 104, sensing means 106, and motor means 108. The timing means 102 generally provides the timing information for all of the sensor means 66 and control means 40 for a single dryer apparatus 10. The supervisory means 104 provides the control for a single bag 18, i.e., only one each bag 104, within the apparatus 10. The sensing means 106 is located within each sensor 66 and operates in conjunction with the supervisory means 104 for sensing the distance of a bag 18 from the vehicle A plurality of sensing means 106 may be used on each bag 18 within each sensor means 66. The motor means 108 is responsive to the supervisory means 104 to control operation of the motor for retracting the bag 18 when desired.

As illustrated in FIG. 6, the timing means 102 receives an analog voltage signal, i.e., 24 vac from a transformer, and includes clip means 110 for clipping the amplitude to a predetermined amplitude of the analog signal. The clipping means 110 produces an amplitude controlled signal which is received by a zero crossing detector 112 which detects each zero crossing to produce a positive going pulse. The pulse is received by a pulse inverter means 114 which inverts the pulse producing a negative going pulse at 120 Hz as a timing signal. The inverted pulse signal is received by the supervisory means 104.

The supervisory means 104 includes oscillating means 116 for producing a clock signal of 640 KHz. A ripple counter 118 receives the clock signal and the timing signal comprising the inverted pulse to produce a transmit signal and a reset signal. The counter 118 produces the transmit signal at 40 KHz for eight pulses for each timing signal pulse and the reset signal is produced at a divide by 16 output wherein a pulse is produced for the reset signal for the last 4 of the 8 pulses of the transmit signal. The supervisory means 104 includes an integrator 120 for receiving the reset signal and initiating at distance ramp which establishes amplitude vs. time. Also included in an echo detector 122 for receiving the reset signal to reset itself to wait and detect the echo and a receiver signal representing the echo to produce a set signal upon reception of the receiver signal. A pulse formatter 124 formats the output of the echo detector 122 to produce the set signal in the form of a pulse. Distance means 126 receives the set signal and compares same to the distance ramp to produce a control signal indicative of distance of the bag 18 from the vehicle. The distance ramp is initiated at the time of the transmission of pulses to the vehicle and starts high and decrements magnitude or voltage proportional to time. The set signal represents the time for reception of the reflected transmissions, and therefore comparison to the ramp is indicative of the time delay.

The sensing means 106 includes driver means 128 for receiving the transmit signal and producing ultrasonic transmissions through transmitter 130 of the eight pulses it receives at the 40 KHz. The sensing means 106 also includes receiver oscillator means 132 for producing a receiver timing signal at a similar 40 KHz. The receiver looks during a two second window to receive the echo. The receiver timing signal is amplified by amplifier 134 and communicated to a tone detector 136. The tone detector is tuned to 40 KHz, the same as the transmitted signal. Upon detection of the tone, the tone detector 136 produces the receiver signal to the echo detector 122 to initiate the distance sensing.

The motor means 108 receives the control signal by a unity gain amplifier 138 which is then sent to an offset inverting amplifier 140. The inverting amplifier 140 produces the magnitude distance signal. Also included is a motor current monitor 142 for monitoring the current drawn by the motor 42. A current integrator 144 receives the current magnitude from the motor current monitor 142 and produces a minimum signal when the current is below a predetermined limit. OR-ring means 146 receives both the magnitude distance signal and the minimum signal and passes the greater of the two signals. The passed signal is amplified by a unity gain amplifier 148 and is communicated to drive means 150 to in turn drive the motor 142. The minimum signal is provided to maintain the cord 36 taut.

The timing means 102 is generally positioned within a control box 152 on a beam member 16 of the apparatus 10. The supervisory means 104 is contained within the supervisor sensor means 68 wherein only one supervisor sensor means 68 and supervisory means 104 is included on each bag 18. Generally, it is desirable to have more than one sensor means 66 on each bag to ensure that the sensing means 66 will sense the vehicle irrespective of orientation of the bag 18 to the vehicle. Therefore, the satellite sensor means 70 is utilized to supplement the supervisor sensor means 68 on the front and back sides of the nozzle 26. Both of the supervisor sensor means 68 and satellite sensor means 70 include the sensing means 106 therein. The satellite sensing means 70, which also includes sensing means 106 therein, will receive all signals required and communicate the receiver signal to the supervisory means 104 associated with the particular bag 18 thereon. The motor drive means 108 is placed adjacent the motor 42 in the housing 64.

Figure 12:
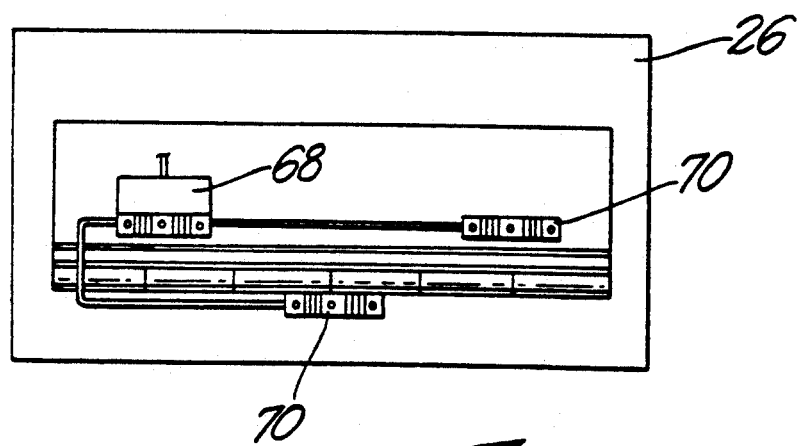
FIG. 12 is an end view of the nozzle and sensors on the vertical bag.

The bags 18 include at least one sensor means 66 positioned thereon, one of which is the supervisor sensor 68. With regard to the overhead or vertical bags 18a, sensor means 70 are placed on both sides of the nozzle 26 as illustrated in FIG. 12. The supervisor sensor 68 is on the front side and the satellite sensor 70 is on the rear side of the nozzle 26. The left overhead bag 18a has the sensors 68, 70 located near the center the nozzle 26, and the right overhead bag 18a has the sensors 68, 70 located at the extreme left side of the nozzle 26 to compensate for smaller width vehicles. The horizontal bags 18b have two front sensors 66 aligned with the wheel well and mirror, and one rear sensor 66. On the left side, the upper left bag 18b has one front and one rear sensor 66 and the lower bag 18b has two front and one rear sensor 66 positioned as in the right side. All bags 18 have one supervisor sensor 68 which is generally positioned on the front surface of the nozzle 26.

The back side 91 of the sensors 66 may have a rear flap 93 extending thereagainst and fixedly attached to nozzle 26. The flap 93 ensures that the vehicle cannot catch on a sensor 66 when passing therethrough.

Figure 7:
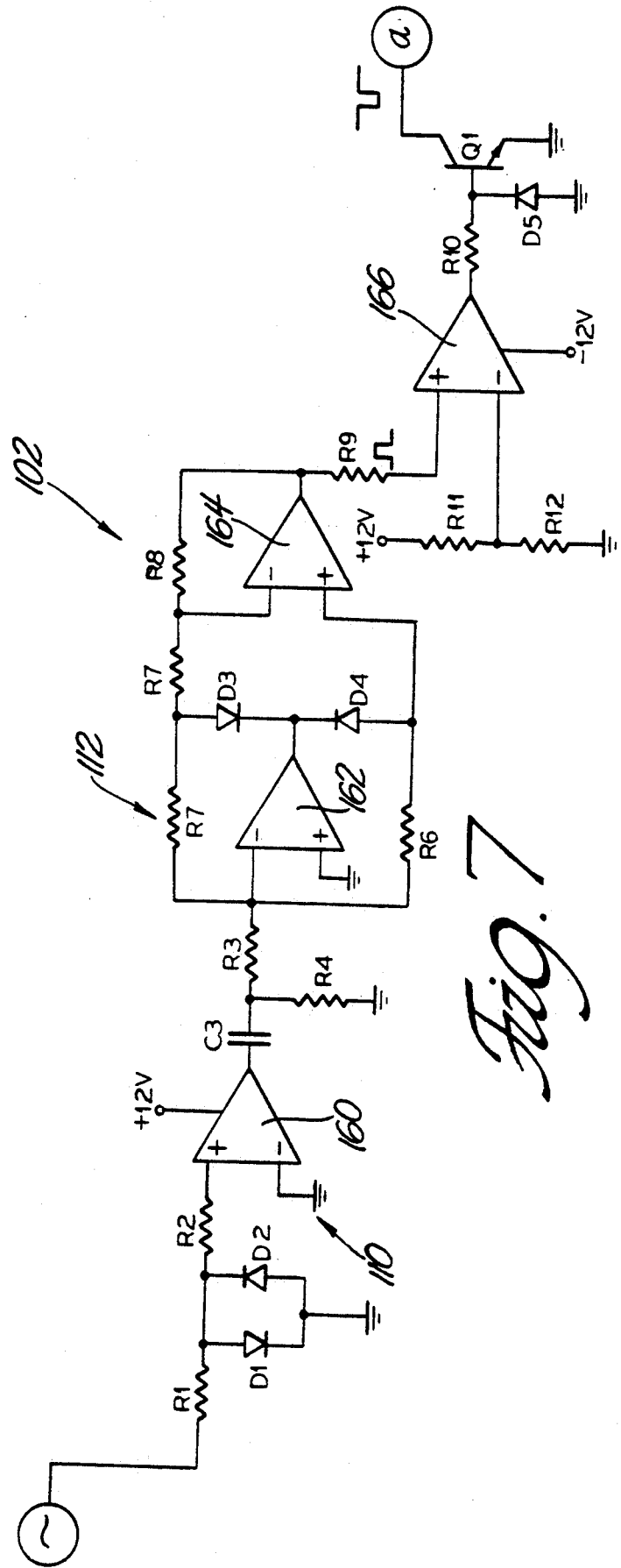
FIG. 7 is a schematic diagram of the timing means.

FIG. 7 illustrates the schematic diagram of the timing means 102, and will be now described. The timing means 102 receives a 24 volt analog power signal. It is to be understood that suitable voltage regulators may be used to produce the other power levels indicated in the schematics. The analog power signal is received by the clipping means 110 which comprises a resistor R1 in series with the power source and connected to a pair of parallel opposite polarity diodes D1, D2 which are connected to ground. A resistor R2 is connected to the diode D1, D2 and to the noninverting input of operational amplifier 160 having its inverting input grounded. The output signal is attenuated by capacitor C3 and a resistor R4 is connected to ground and to resistor R3 which is connected to the zero crossing detector 112. The zero crossing detector 112 comprises an operational amplifier 162 having its inverting input connected to resistor R3 and its noninverting input connected to ground with feedback to the inverting input through reverse bias diode D3 to resistor R5 and through forward bias diode D4 through resistor R6. The D3, R5 connection is connected to resistor R7 and connected to the inverting input of a second operational amplifier 164 wherein the noninverting input is connected to the D4, R6 connection. Feedback is provided through resistor R8 to the inverting input. The output of the operational amplifier 164 is connected through resistor R9 producing the positive going pulse upon each zero crossing of the analog signal. The pulse invertor means 114 receives the positive going pulse to produce a negative or inverted pulse producing the timing signal. The pulse inverting means 114 comprises an operational amplifier 106 receiving the positive going pulse at its noninverting inputs and has its inverting input connected a voltage divider circuit comprising resistors R11 and R12. The output of the operational amplifier 166 is connected through resistor R10 to a grounded reverse bias diode D5 and to drive a transistor Q1 at its base producing the timing signal at it collector.

Figure 8:
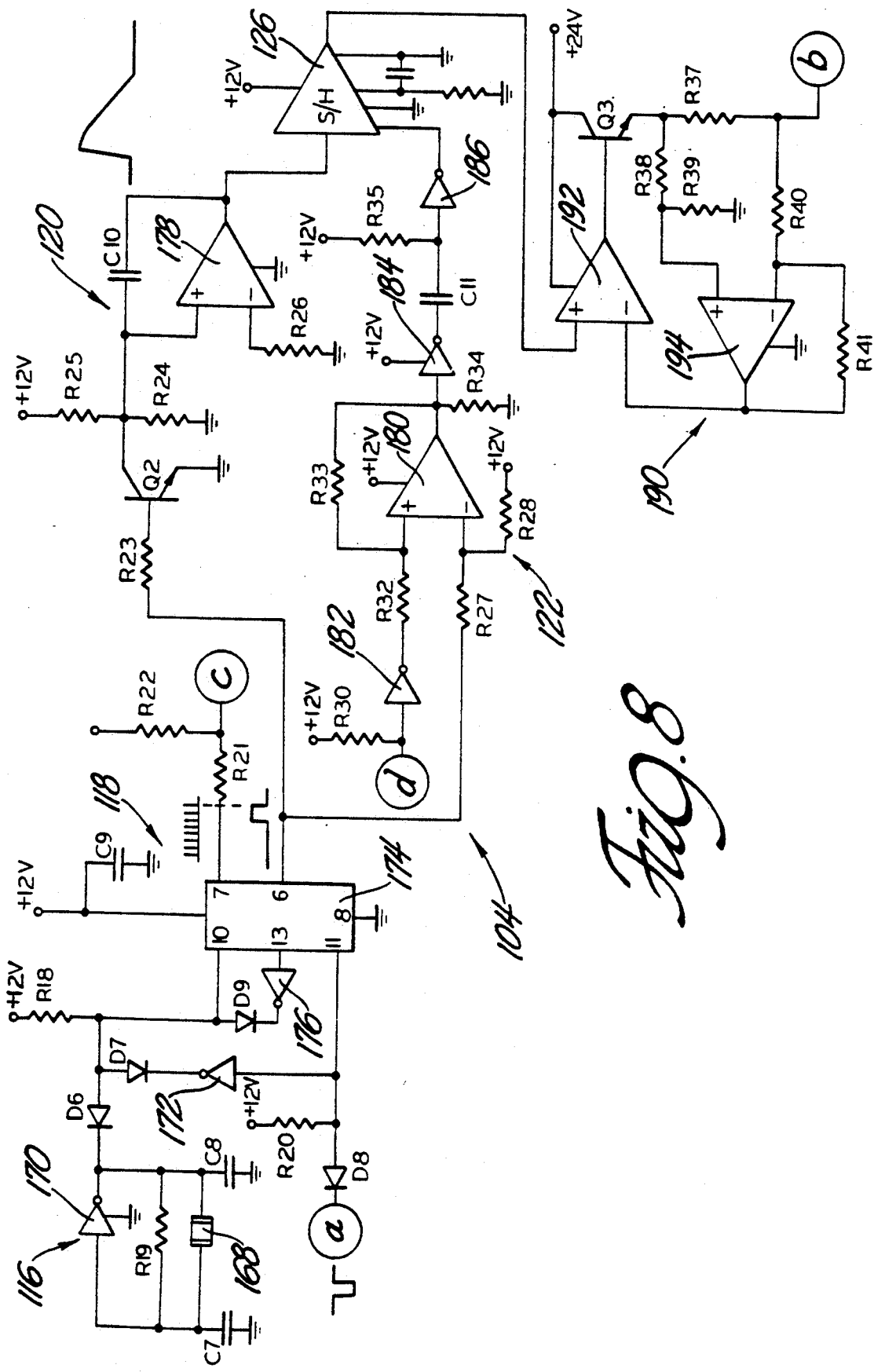
FIG. 8 is a schematic diagram of the supervisory means.

FIG. 8 illustrates the schematic of the supervisor means 104. The oscillator means 116 includes a crystal oscillator 168 connected between two grounded capacitors C7, C8. Parallel with the crystal 168 is a resistor R19 and parallel therewith is invertor 170. The output of the invertor 170 is connected through a diode D6 to resistor R18 to power, and to diode D7 to an invertor 172 to the timing signal. This produces the clock signal of 640 KHz. The timing signal is received by a reverse biased diode D8 and connected through resistor R20 to power and to the input of the ripple counter 118. The ripple counter 118 comprises a ripple binary counter 174 of the type national semiconductor CD4020BCN. The ripple counter 174 receives at pin 10 the clock signal and at pin 11 the timing signal. Pin 13 is connected through invertor 176 to diode D9 to the clock signal. Power is supplied to pin 16 with a ground capacitor C9 and ground is provided at pin 8. The counter 174 produces the transmit signal through resistor R21, which is also connected to resistor R22 to positive voltage. The pin 6 output produces the reset signal.

The integrator means 120 receives the reset signal and comprises a resistor R23 connected to the base of transistor Q2 having its emitter grounded and its collector connected to voltage divider comprising R24 to ground and R25 to voltage. The collector signal is received at the inverting input of an operational amplifier 178 having feedback therethrough through capacitor C10, with its noninverting input connected through resistor R26 to ground. The output of the operational amplifier 178 produces the ramp signal.

The reset signal is also received by the echo detector means 122 which comprises a resistor R27 receiving the reset signal and connected to resistor R28 to power and the inverting input of operational amplifier 180. The receiver signal is received by resistor R30 to power and by invertor 182 through resistor R32 and to the noninverting input of the operational amplifier 180. Feedback is provided through resistor R33 to the noninverting input. The output of the operational amplifier 180 is connected by resistor R34 to ground and invertor 184, through capacitor C11 with resistor R35 connected to power and to invertor 186 to the distance means 126. The distance means 126 includes a sample/hold circuit which receives both the set signal and the ramp signal for producing an output indicative of the point on the ramp at the occurrence of the set signal in time. The occurrence signal is sent to a current source 190 comprising an operational amplifier 192 receiving the signal at its noninverting input and having its output driving the base of transistor Q3 having its collector committed to power and its emitter connected to resistor R37 and R38. Resistor R38 is connected to ground through resistor R39 and to the noninverting input of operational amplifier 194 which has its inverting input connected to resistor R40 to the control signal and having feedback through resistor R41 to the inverting input. The output of operational amplifier 194 is connecting to the inverting input of operational amplifier 192.

Figure 9:
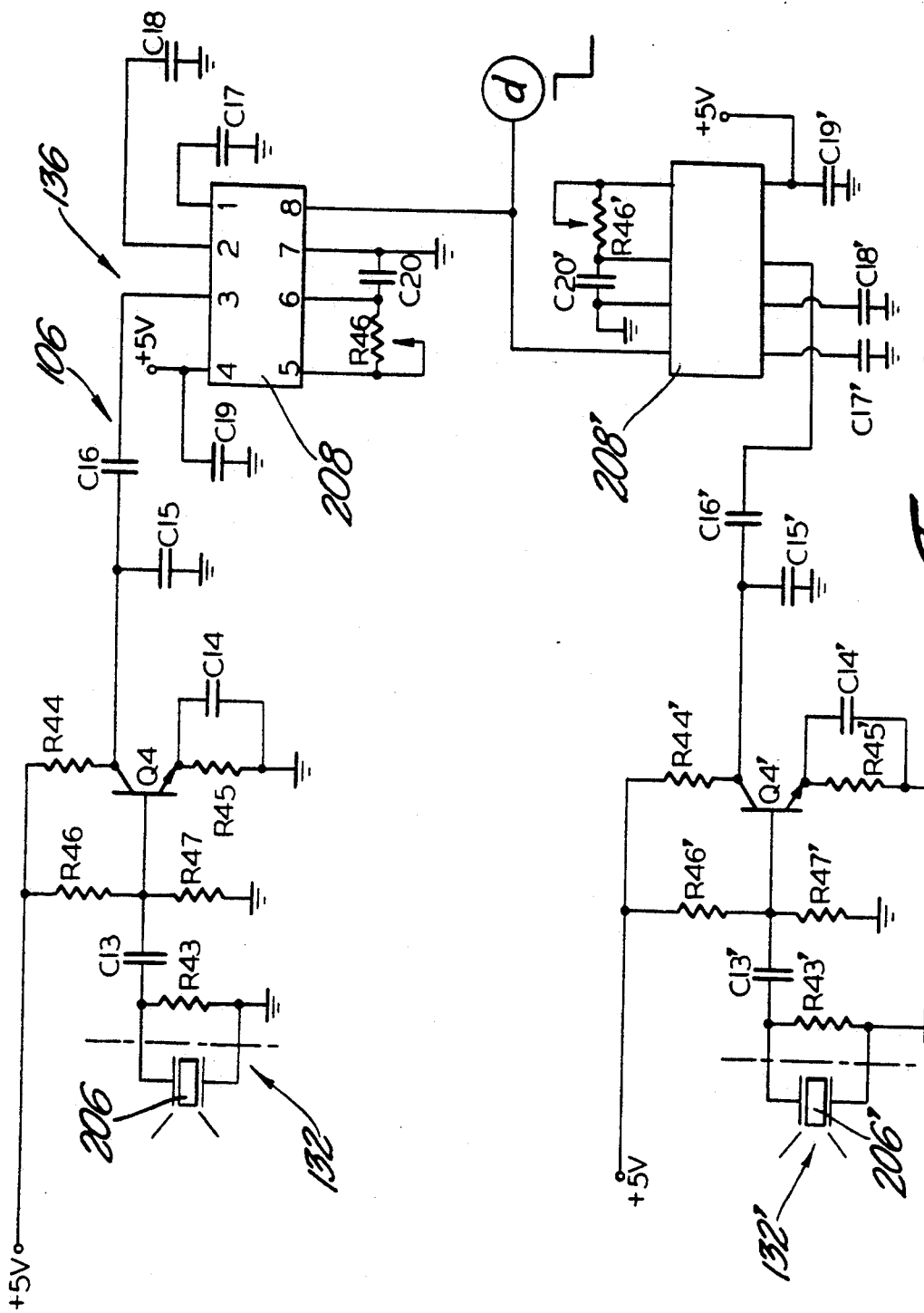
FIG. 9 is a schematic diagram of the receiver of the sensor means.
Figure 11:
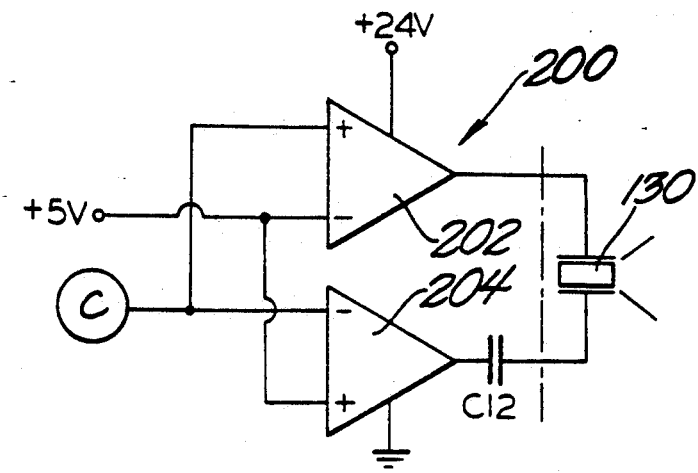
FIG. 11 is a schematic of the transmitter of the sensor means.

The sensing means 106 is more particularly illustrated in FIGS. 9 and 11. The sensing means 106 includes transmitter means 200 (FIG. 11) for receiving the transmit signal and comprises two drive operational amplifiers 202, 204 wherein the first operational amplifier 202 receives power at its inverting input and receives transmit signal at its noninverting input, and the second operational amplifier 204 is configured as the first with an output capacitor C12 at its output, both connected to an output transmitter 130. The transmitter 130 is located a the transmitter aperture 80, 81 in the sensor housing 68, 70. The sensor is of the type ultrasonic sensor MA series by MURATA MFG. CO. The sensing means 106 also includes the receiver (FIG. 9). The receiver includes the oscillator 132 comprising a crystal oscillator 206 parallel with the grounded resistor R43, and connected to a series capacitor C13 and to the base of transistor Q4. A resistive divider circuit comprising resistors R46, R47 are connected at the base between power and ground. The collector is connected through resistor R44 to positive voltage and the emitter is connected through parallel resistor capacitor R45, C14 ground circuit. The emitter is connected to a parallel capacitor C15 for attenuation and to a coupling capacitor C16, comprising the amplifier 132. Capacitor C16 is connected to the input of the tone detector means 136. The tone detector means 136 comprises a tone decoder 208 of the type of National Semiconductor LMC567, low power tone decoder. The tone detectors 208 require so many cycles to be detected to lock on the phase. Two capacitors C17, C18 are provided as an output filter and loop filter, and power and a capacitor C19 are provided at pin 4 as a voltage source. The timing of the decoder 208 is provided at pins 5, 6 and 7 through variable resistor R46 and capacitor C20. Output is provided at pin 8 providing the receiver signal. When the tone is detected, the receive signal goes to ground. As previously indicated, each of the sensing means 66 comprises the two receiver means 132 with the single transmitter 200. Therefore, the second receiver 132' is configured identical to the first receiver wherein primed numerals indicate similar parts. Both of the signals from the tone detectors 208, 208' are combined to provide the receiver signal.

Figure 10:
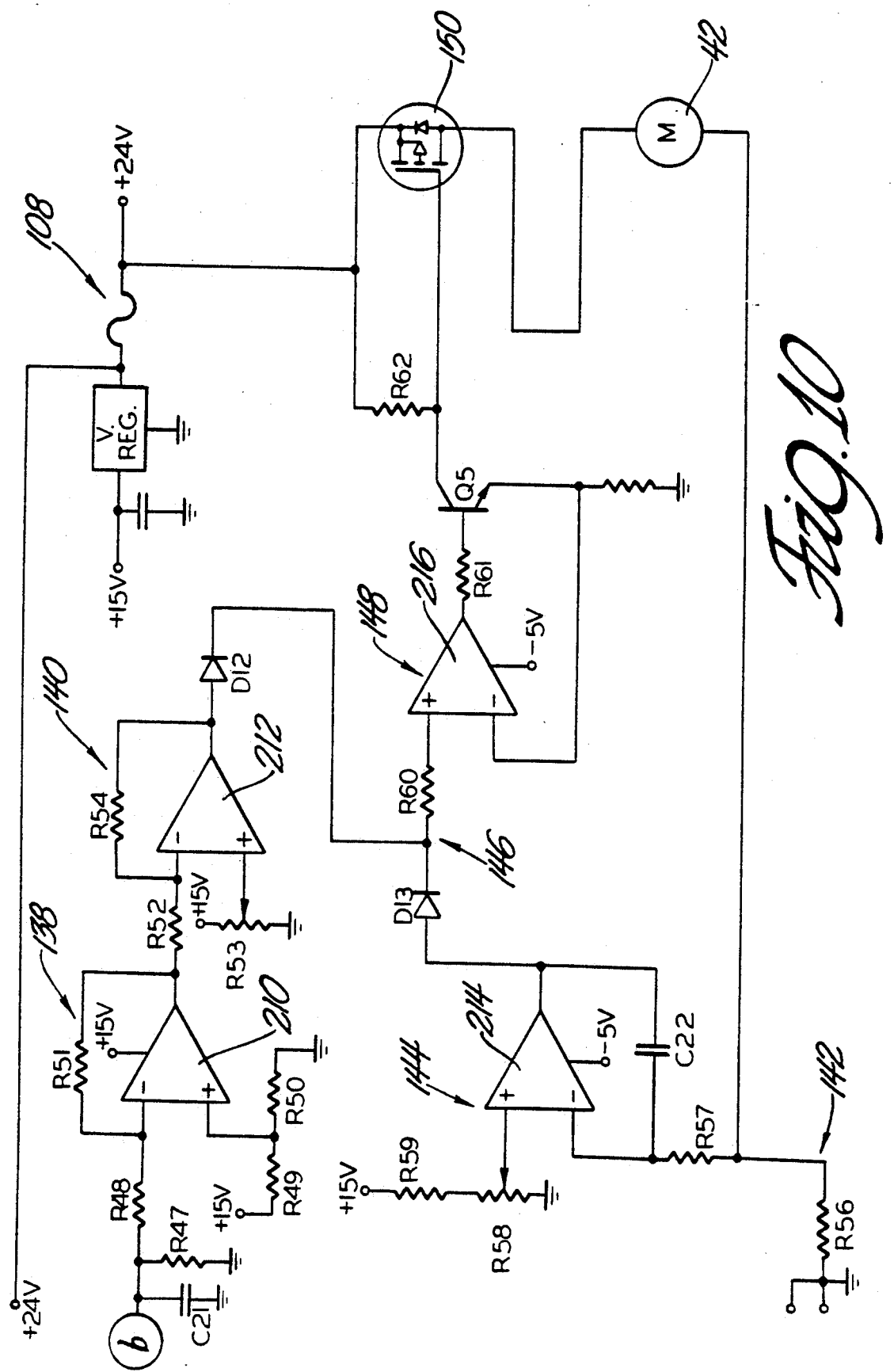
FIG. 10 is a schematic diagram of the motor control means.

The motor means 108 is specifically illustrated in FIG. 10. The control signal is received by the unity gain amplifier 138 which comprises a parallel grounded capacitor C21 and resistor R47 on the input line and a series resistor R48 to the inverting input of operational amplifier 210 having its noninverting input connected to a voltage divider comprising resistors R49 and R50. Feedback to the inverting input is provided through resistor R51. The output of operational amplifier 210 is provided through resistor R52 to the inverting input of operational amplifier 212 having its noninverting input connected to a variable resistor R53. Feedback to the inverting input is provided through resistor R54. The output of operational amplifier 212 is fed through a diode D12 providing the magnitude distance signal. The operational amplifier 212 comprises the inverting amplifier means 140. The motor current monitoring means 142 comprises a resistor R56 for monitoring the current draw on the motor which is connected through the resistor R57 to the inverting input of operational amplifier 214 to comprise the minimum current integration means 144. The noninverting input is connected to a variable resistor R58 and fixed resistor R59. Feedback is provided to the inverting input through capacitor C22. The output of the operational amplifier 214 through diode D13 provides the minimum signal. The diode D12 and D13 provide for an O-ring or combining circuit 146 wherein the highest signal is sent to the unity gain amplifier means 148. The unity gain amplifier means 148 comprises an operational amplifier 216 having its noninverting input connected to the resistor R60 receiving the Or'd signal and its inverting input connected in unity gain follower feedback to the emitter of a transistor Q5. The output of the operational amplifier 216 is fed through resistor R61 to the base of transistor Q5. The collector of transistor Q5 is connected through resistor R62 to power and to the drive transistor 150. The drive transistor 150 generally comprises a MOSFET wherein the emitter of transistor Q5 is connected to the gate of MOSFET 150. The source is connected to power and the gate is connected to the motor 42.

In operation, when a vehicle is passing through the apparatus, the air distributor 12, 14 is operated and the control means 40 is powered. The timing means 102 produces a timing signal which is received by the supervisory means 104. The supervisory means 104 produces the transmit signal which is received by the sensors 66 for ;periodic transmission. The reset signal is produced periodically and upon reception by the receiver, the receiver signal is received by the echo detector 122. No further operation takes place until the echo detector 122 receives the receiver signal. Upon a sensor means 66 having a surface of the vehicle passing within a predetermined distance, the echo signal is produced which in turn will control the height or distance from the vehicle of the respective bag 18. When a reflection is received, the supervisory means 104 detects the distance to the vehicle. The motor vehicle means 108 receives the detected distance to the vehicle and when less than a predetermined amount, energizes the motor 42 to maintain the predetermined distance. The motor 42 is released or deenergized when the detected distance is greater than the predetermined distance, wherein the weight of the bag 18 unwinds the cord 36 from the motor 42.

When the sensor signal is low, the motor means 108 maintains a minimum current to the motor 42 to hold the core 46 taut. This is beneficial in the case that a person retracts the bag manually or other means, the motor 42 will also retract the cord 36 to prevent any type of entanglement with other obstacles. Upon release of the bag 18, the bag 18 will be allowed to fall to its original position or most extended position.

The supervisory means 104 on each bag receives all of these sensor signals and controls the motor means 108 in response thereto. Therefore, each of the bags 18 is controlled independently of the other bag. Each bag 18 will maintain a predetermined distance to the vehicle and obstacles detected in the path without contact thereof.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An apparatus for controlling the distance from a moveable member to the surface of an object moved relative to the apparatus along a path comprising:
    a support member (14);
    a moveable member (18) operatively connected to said support member (14);

actuator means (34) operatively connected between said support member (14) and said moveable member (18) for moving said moveable member (18) toward and away from the surface;

control means (40) connected to said support member (14) and operatively connected to said actuator means for receiving a single control signal and for controlling movement of said actuator means (34);

a plurality of sensor means (66) connected to said moveable members (18) each sensor means sensing the distance to the surface and producing a sensed signal that is communicated to said control means; and combining means (146) located on said moveable member for receiving and combining said sensed signal from each of said plurality of sensor means (66) and for producing said single control signal therefrom.

2. An apparatus as set forth in claim 1 further characterized by said plurality of sensor means (66) including supervisor sensor means (68) for producing a transmit signal to produce a plurality of transmissions directed toward the surface and to receive reflected transmissions producing a receiver signal, for receiving a plurality of receiver signals, and for producing said control signal indicative of the distance to the surface.

3. An apparatus as set forth in claim 2 further characterized by said plurality of sensor means (66) including satellite sensor means (70) for receiving said transmit signal and producing a plurality of transmissions directed toward the vehicle and for receiving reflected transmission to produce a receiver signal communicated to said supervisor sensor means (68).

4. An apparatus as set forth in claim 3 further characterized by said sensor means (66) including supervisory means (104) for receiving said transmit signal and producing said transmissions, and supervisor receiver means for receiving reflected transmissions for producing a receiver signal.

5. An apparatus as set forth in claim 4 further characterized by including timing means for producing a timing signal; said supervisory means (104) including an oscillator means (116) for producing a clock signal, counter means (118) for receiving said clock signal and said timing signal to produce said transmit signal and a reset signal, integration means (120) for receiving said reset signal to initiate a distance ramp, echo detector means (122) for receiving said reset signal and said receiver signal and for producing a said signal upon reception of said receiver signal, and distance means (126) for receiving said set signal and comparing to said distance ramp to produce said control signal.

6. An apparatus as set forth in claim 5 further characterized by said satellite sensor means (70) including satellite transmit means (200) for receiving said transmit signal and producing said transmission, and satellite receiver means (132) for receiving reflected transmissions for producing said receiver signal.

7. An apparatus as set forth in claim 1 further characterized by each of said sensor means (66) including independent transmitter means (200) for producing transmissions and receiver means (106) for receiving reflected transmissions producing said sensed signal.

8. An apparatus for controlling the distance from a moveable member to the surface of an object as the object is moved relative to the apparatus along a path comprising:

a support member (14);

a moveable member (18) operatively connected to said support member (14);

actuator means (34) operatively connected between said support means and said moveable member (18) for moving said moveable member toward and away from the surface;

control means (40) operatively connected to said actuator means (34) for receiving a control signal to control movement of said actuator means (34);

said apparatus characterized by said actuator means (34) including link means (36) operatively connected to said moveable member (18) for controlling the position of said moveable member (18), and retracting means (38) connected to said link means (36) and responsive to said control signal for actuating said link means (36) to position said moveable member a predetermined distance from the surface, said control means (40) including tension means (44) operatively connected to said retracting means (38) for maintaining tension on said link means (18) at a predetermined level to raise said member in response to an external raising force placed on said moveable member.

9. An apparatus as set forth in claim 8 further characterized by said retracting means (34) comprising motor means (42) for controlling tension upon said moveable member through said link means (36) to retract and allow tensioning thereof.

10. An apparatus as set forth in claim 9 further characterized by said control means (40) including monitoring means (142) for monitoring current draw on said motor means (42) for producing a minimum signal when said current is below a predetermined limit.

11. An apparatus as set forth in claim 10 further characterized by said control means (40) including drive means (148, 150) for receiving said minimum signal and said control signal and for actuating said motor means to retract said moveable member and for maintaining tension on said link means by said motor means (42) when said minimum signal is greater than said control signal.

12. An apparatus as set forth in claim 11 further characterized by including timing means (102) for producing said timing signal to said counter means (118).

13. An apparatus as set forth in claim 12 further characterized by including motor means (108) for receiving said control signal and controlling said actuator means (34).

14. An apparatus as set forth in claim 13 further characterized by said actuator means (34) including link means (36) operatively connected between said moveable member and said motor (18) for controlling the position of said moveable member (18) responsive to said motor driver means (108) for retracting said link means (36) to position said moveable member a predetermined distance from said vehicle.

15. An apparatus as set forth in claim 14 further characterized by said link means (36) comprising a cable, said retracting means (34) comprising motor means (42) for controlling tension upon said cable (36) to retract and allow tensioning thereof.

16. An apparatus as set forth in claim 15 further characterized by said control means (40) including monitoring means (142) for monitoring current draw on said motor means (42) for producing a minimum signal when said current is below a predetermined limit.

17. An apparatus for controlling the distance from a moveable member to the surface of an object as the object is moved relative to the apparatus along a path comprising:
- a support member (14);
- a moveable member (18) operatively connected to said support member (14);
- actuator means (34) connected between said support member (14) and said moveable member (18) for moving said moveable member toward and away from said surface;
- control means (40) operatively connected to said actuator means (34) for receiving a control signal to control movement of said actuator means (34);
- said control means (40) including a plurality of sensor means (66) connected to said member (18) for sensing the distance to the surface and for producing a received signal; and
- said control means including oscillator means (116) for producing a clock signal, counter means (188) for receiving said clock signal to produce a transmit signal and a reset signal, integration means (120) for receiving said reset signal to initiate a distance ramp, echo detector means (122) for receiving said reset signal and said received signal and for producing a set signal upon reception of said received signal, and distance means (126) for receiving said set signal and comparing to said distance ramp to produce said control signal.

18. An apparatus for controlling the distance from a moveable member to the surface of an object moved relative to the apparatus along a path comprising:
- a support member (14);
- a moveable member (18) operatively connected to said support member (14) and having a front and rear side;
- actuator means (34) operatively connected between said support member (14) and said moveable member (18) for moving said moveable member (18) toward and away from the surface;
- control means (40) connected to said support member (14) and operatively connected to said actuator means (34) for receiving a single control signal and for controlling movement of said actuator means (34);
- a plurality of sensor means (66) connected to said moveable member, (18) each sensor means sensing the distance to the surface and producing a sensed signal, at least one sensor being located on the front side and at least one sensor being located on the rear side of said moveable member (18) for sensing different areas; and combining means (146) for receiving and combining said sensed signal from each of said plurality of sensor means (66) and for producing said single control signal.

* * * * *